May 22, 1923.
J. L. KIVLAN
JAR TRIMMING MACHINE
Filed Jan. 12, 1921
1,456,276
3 Sheets-Sheet 2
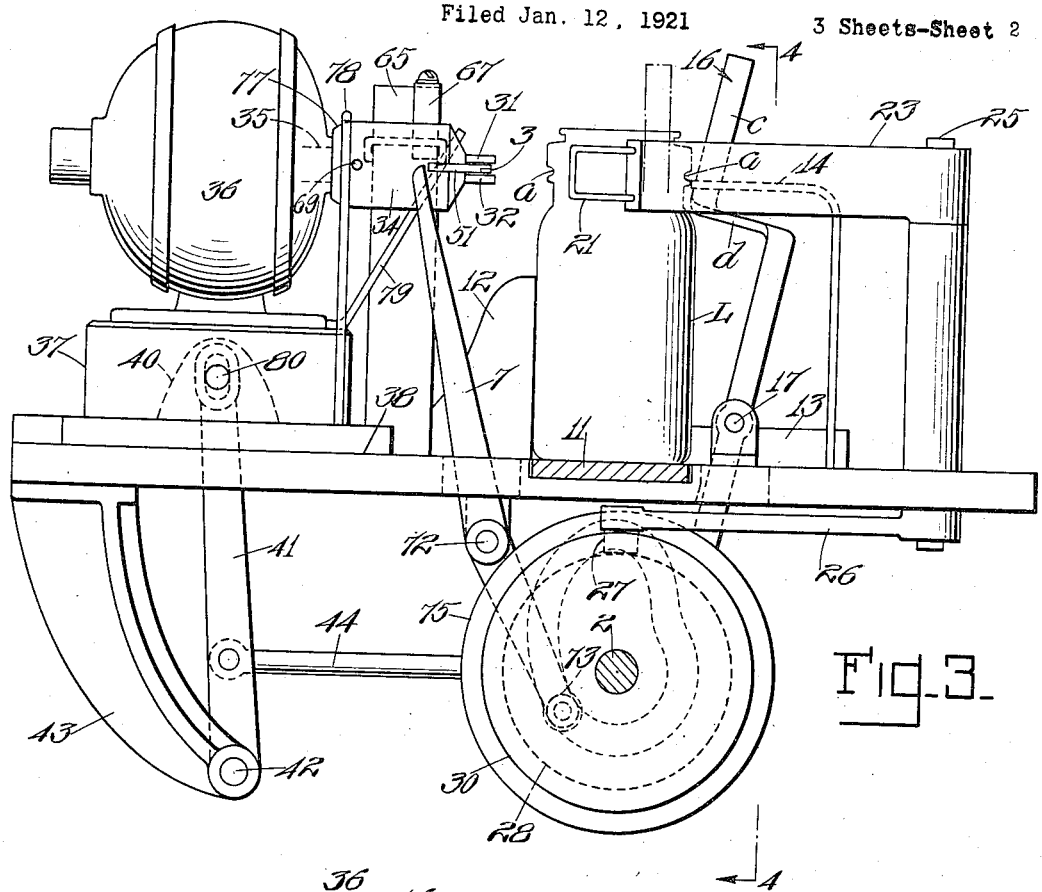

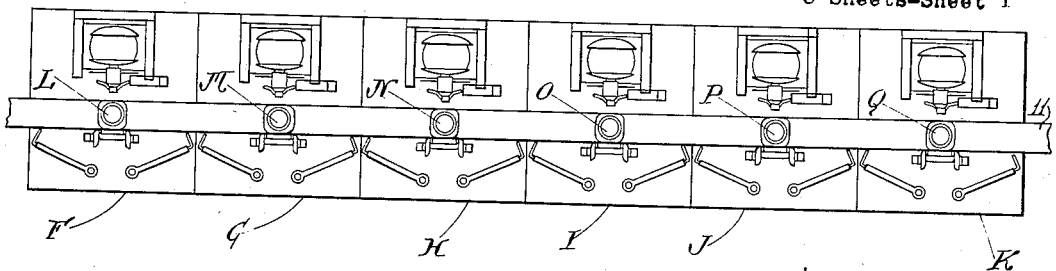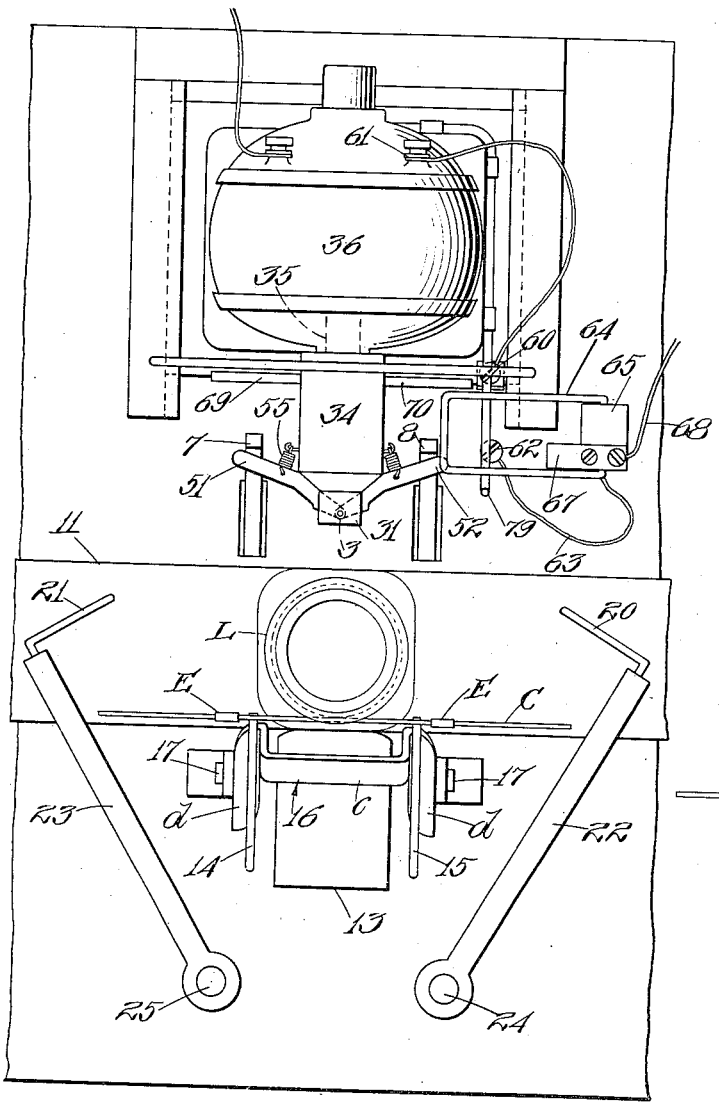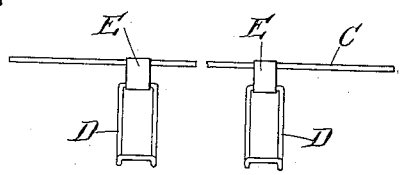

May 22, 1923.

J. L. KIVLAN

JAR TRIMMING MACHINE

Filed Jan. 12, 1921

INVENTOR:
John L. Kivlan
by Macleod, Cahn, Copeland & Pike
ATT'YS

Patented May 22, 1923.

1,456,276

UNITED STATES PATENT OFFICE.

JOHN L. KIVLAN, OF BOSTON, MASSACHUSETTS.

JAR-TRIMMING MACHINE.

Application filed January 12, 1921. Serial No. 436,761.

*To all whom it may concern:*

Be it known that I, JOHN L. KIVLAN, a citizen of the United States, residing at Boston, county of Suffolk, State of Massachusetts, have invented a certain new and useful Improvement in Jar-Trimming Machines, of which the following is a specification, reference being had therein to the accompanying drawings.

My invention has for its object a machine for applying to glass fruit jars the trimmings which are the metallic portions by means of which the top is held in place. The trimming includes a bail or hook to engage the cover and a tie wire encircling the neck of the jar and secured in place by twisting together the ends of the wire. Heretofore, the work of applying the trimmings to the jar, which work has been commonly known as "trimming the jar," has been performed entirely by hand and is an expensive and tedious operation requiring considerable skill for its rapid performance.

My present invention has for its object to produce an automatic machine by means of which fruit jars can be trimmed at small expense for labor and with much greater rapidity than has heretofore been possible.

The machine as constructed for operating on a single jar, comprises several working instrumentalities capable respectively of bending the tie wire around the neck of the jar, twisting the ends together and flattening them against the neck of the jar. In practice, however, and to obtain the most beneficial results from the employment of my invention, I arrange these units in batteries of six or more along a conveyor or endless belt which passes through them and conveys the jars to the several units. The conveyor is given an intermittent motion such that it will position a jar before each trimming unit and then remain stationary while the trimming units perform their functions, the trimming of the six jars taking place simultaneously.

In the accompanying drawings, I have shown the units embodying my invention as comprising certain working instrumentalities, these being shown in the best form now known to me, but it will be understood that I do not limit myself to the particular form shown, except as specifically stated in the claims, since I believe myself to be the first to have devised an automatic machine for trimming jars and therefore desire to claim my invention in the broadest possible terms.

Furthermore, in this application, I have shown my invention as embodied in a machine for trimming fruit jars because that is the form in which I have actually put my invention into practice, but it will be understood that it can be employed for trimming other like articles.

The invention will be fully understood from the following description when taken in connection with the accompanying drawings, and the novel features thereof will be pointed out and clearly defined in the claims at the close of this specification.

In the drawings, Fig. 1 is a top plan view of a machine unit embodying my invention.

Fig. 2 is a plan view showing six of the said units arranged along a conveyor.

Fig. 3 is a side elevation of the unit shown in Fig. 1.

Fig. 4 is a section taken on line 4—4 of Figure 3.

Figure 5:
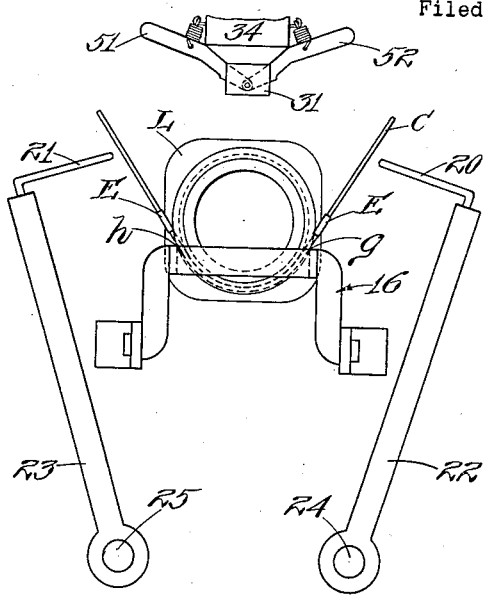

Figs. 5 to 9 inclusive are diagrammatic views illustrating the mode of operation of the bender, wipers, twister and flattener.

Fig. 10 is a detail of the twister.

Fig. 11 is a view showing a trimming in condition to be applied to the neck of the jar.

Fig. 12 shows a jar to which a trimming has been applied.

Referring now to the drawings and particularly to Figures 11 and 12, at A is shown the jar to which the trimming is to be applied, the neck being shown at *a* and cover at B. The trimming herein shown consists of a tie-wire C and two hook-shaped clamps D, D secured to the tie-wire by the members E, E. To apply the trimming to the neck of the jar, the tie-wire must be bent around the jar in the neck or groove, and the ends of the tie-wire twisted together by giving them a half turn, after which the ends must be flattened so that they will lie flat against the neck of the jar in the position in Figures 9 and 12.

Referring now to Figures 1, 2 and 3, there is shown at 11, a conveyor passing through six trimming units, F, G, H, I, J and K respectively. The operator stands near the centre of the machine where she can readily place the trimmings in proper position in each of the six units. After she has done this, she starts the six units simultantously, whereupon they apply simultaneously the trimmings to the neck of the six jars, L, M, N, O, P and Q. When the work of applying the trimmings is completed, the conveyor moves the six trimmed jars out of position, coming to rest again when six untrimmed jars reach the position to receive the trimmings. As each trimming unit is the same as the others, I will describe only one.

The jar L to be trimmed rests on the belt 11 and is between a brace 12 and a bedplate 13 which prevent displacement of the jar by the action of the working instrumentalities of the machine and ensure the correct positioning of the jar in the machine. Adjacent the front of the jar is a pair of stationary horizontal fingers 14 and 15 which have their upper surface on a level with the neck or groove $a$ of the jar. These fingers form supports for the trimming C which is laid thereon, as shown in Figure 1, with the tie-wire in horizontal position and with the two clamps or hooks E hanging down therefrom.

At 16 is shown a member which I call the bender and which begins the work of bending or wrapping the tie-wire around the neck of the jar. It consists of a U-shaped upper portion $c$ offset as shown at $d$ (see Figure 3), and legs pivoted at 17, the lower ends of the legs being brought together, as shown in Figure 4, and extended downwardly to form an arm which carries a cam roller 18 running in a groove of a plate cam 19 mounted on the main shaft 2 of the machine. It will therefore be seen that every time the main shaft revolves, the bender 16 is swung forward toward the jar to the position shown in dot-and-dash lines in Figure 3, and by so doing, first pushes the wire against the neck of the jar and then bends the tire-wire part way around it. The action of the bender will be easily understood by reference to Figure 5 where the bender is seen in its extreme position, the tie-wire C having been bent around the neck of the jar as far as this is done by the action of the bender. Only the edges of the bender, as shown at $g$ and $h$ contact with the tie-wire, and these do not move far enough along it to strike the clamps E which hang down from the tie-wire.

At 20 and 21 is shown a pair of flexible wipers carried by arms 22 and 23 and mounted respectively on the upper ends of vertical shafts 24 and 25. The wipers 20 and 21 are constructed to yield slightly and are preferably U-shaped wire loops, as shown at 21 in Figure 3, so that they will be certain to engage the legs of the tie-wire, even though there should happen to be some slight vertical displacement as sometimes occurs. The shafts on which the wipers are mounted extend down beneath the bedplate of the machine and are provided with cam levers 26, as shown in Figure 3, each carrying a cam roll 27 located in a cam groove 28 in the periphery of two cams 29 and 30 also located on the main shaft. These parts are so arranged that the two wipers 20 and 21 are caused to approach each other simultaneously, as shown in Figure 5, and strike the legs of the tie-wire $c$ and bend the same around the neck of the jar to the position shown in Figure 6. The wipers engage the legs of the tie-wire at a point beyond the largest diameter of the jar, and as they come together, bend slightly, holding the legs of the tie-wire crossed in the position shown in Figure 6 ready for the action of the twister which will now be described.

Figure 6:
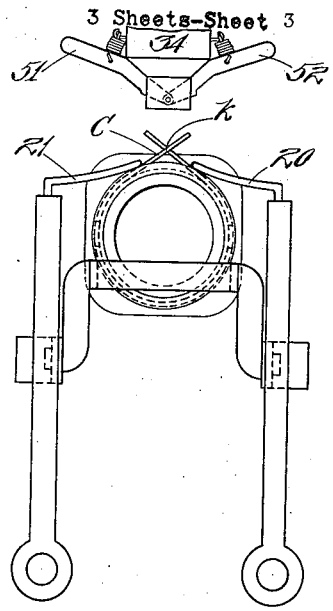
Figure 8:
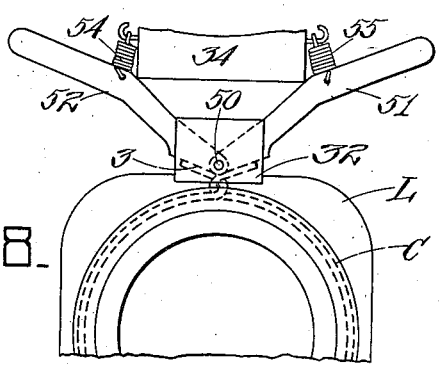
Figure 7:
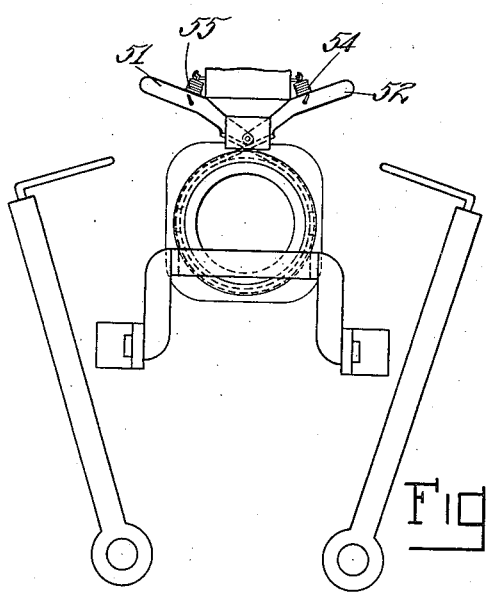

The twister comprises two lips 31 and 32 separated by a V-shaped nose 3 formed by a pair of fingers 51 and 52 which are pivotally connected to each other and to the lips at 50. These fingers are held back by springs 54 and 55, and their working faces are substantially the thickness of the space between the upper lip 31 and the lower lip 32. These two fingers constitute the flattener. These parts are mounted on a rotatable member shown in the drawings as a square block 34 on the shaft 35 of a small electric motor 36. The electric motor 36 is mounted on a base 37 movable on a slide 38 in a direction at right angles to the direction of movement of the conveyor. The base 37 is cut away on the underside, as shown in dotted lines at 40 in Figure 3, and the space is traversed by a pin or rod 80 which serves as a connection between the base 37 and a lever 41 pivoted at 42 to a bracket 43 forming part of the frame of the machine. The lever 41 is actuated by a cam follower 44 carrying a cam roll 45 running in a cam groove 46 formed in a plate cam 47. It will therefore be seen that the rotation of the cam 47 moves the motor and twister forward, as shown in Figures 6 and 7. In Figure 6, the twister is shown in its rear position, and in Figure 7 it is shown in its extreme forward position. The forward movement of the twister causes the apex of the fingers 51 and 52 to engage the two legs of the tie-wire of the trimming at the point where they cross, which is designated $k$ in Figure 6. After striking the legs of the tie-wires, the twister moves forward a slight distance farther, pushing the legs of the tie-wire against the jar at the point where they cross each other. At this time, the legs of the tie-wire lie in the space between the upper lip 31 and the lower lip 32 of the twister. The twister is then rotated about 180 degrees, as will now be described.

When the electric motor and the twister are moved forward by the cam 47, as previously described, an electric contact 60 connected with one of the binding posts 61 of the motor and located on the base 37 contacts with a stationary contact 62 located on the bedplate of the machine. As will be described hereafter, this completes the circuit through the electric motor and starts it, the rotation being continued until the twister has revolved 180 degrees and the circuit is automatically broken. The contact member 62 is connected by a wire 63 to a hinged stop member 64 mounted in a post 65 of insulating material. The hinged stop member 64 is arranged to swing up and down about a pivot 66 and to contact with a brush 67 which is connected to one of the feed wires 68. Therefore, when the movable contact member 60 engages the stationary contact member 62, the current passes from the binding post 61 through the contacts 60 and 62, wire 63, hinged stop member 64 and brush 67 to the feed wire 68 and will continue to flow through the electric motor as long as the hinged contact member 64 is in contact with the brush 67.

Figure 9:
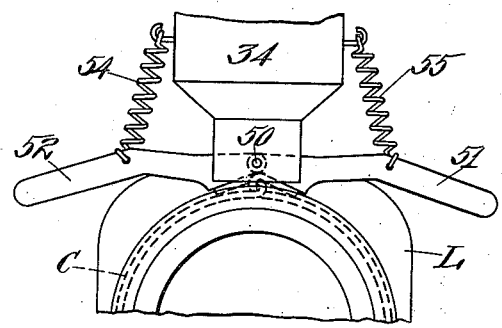

This contact is broken by means of one or the other of two projecting arms 69 and 70 extending outwardly from the block 34 which carries the twister. It will therefore be seen that when the motor has been started, the parts being previously in the position shown in Figure 4, the arm 69 will strike the end of the hinged contact member 64 when the twister has revolved 180 degrees and will push down the contact member, breaking its contact with the brush 67 and opening the circuit. This cuts off the current from the motor, and the arm 69 which brings up against the hinged contact member prevents the armature of the motor and the twister revolving any further through the momentum imparted to it. In the machine shown in the drawings, the twister rotates 180 degrees, but it will be understood that this may be made more or less as the circumstances may require. The rotation of the twister as described, twists together the ends of the tie-wire but would leave them in the position shown in Figure 8 which would be seriously objectionable because the jars could not be handled safely, owing to the protruding ends of the tie-wire. Accordingly, the flattener composed of the bending fingers 51 and 52 is now brought into action to flatten down the ends of the tie-wire, as shown in Figure 9. This is accomplished by two levers 7 and 8 pivoted at 72 to the frame of the machine and carrying at their lower ends cam rolls 73 and 74 engaging cams 75 and 76 on the main shaft of the machine. When the upper ends of the levers are moved forward, they engage the ends of the fingers 51 and 52 and swing them about the pivot 50 to the position shown in Figure 9. The levers then move back out of the way and remain stationary until they are brought into action again during the next cycle of movement of the machine.

The further movement of the main shaft 2 pushes the base 37 and the motor and twister mounted thereon back away from the finished jar to leave room for the transfer of the jar and the next operation of the bender and wipers. As the motor moves back, the block 34, the rear end of which is rounded off as shown at 77, is drawn under the horizontal member 78 which contacts first with the high corner of the block and causes the block 34 to rotate backwards sufficiently to permit it to pass under the horizontal member and thus restore it to horizontal position. This horizontal member also serves to hold the twister block in correct position to receive the ends of the tie-wire from the wipers.

Since the backward movement of the twister would leave the contact member 64 out of contact with the brush 67 so that the next forward movement of the twister slide would not complete the circuit through the motor, I provide means for resetting the contact member 64 comprising a wire 79 secured to the base 37 and extending upwardly at an angle, as shown in Figure 3. This wire extends under the hinged contact member 64 and acts as an inclined cam to lift up the hinged contact member as the base slides back to its original position. When the hinged contact member is lifted up, it makes contact with the brush 67 so that when the slide is again moved forward, the circuit will be closed by the action of the contact 60.

While I have shown and described the twister operating means as electrically operated, I do not limit myself to this construction, since I am aware that under other conditions other equivalent mechanisms may be preferable.

What I claim is:—

1. The jar trimming machine comprising bending mechanism to bend the substantially straight wire of the trimming around the neck of the jar and bring the ends thereof into juxtaposition, and a twister to twist the ends of the wire together and flatten the same against said neck.

2. The jar trimming machine comprising bending machanism to bend the trimming part way around the neck of the jar, wipers to complete the bending, and a twister to twist the ends of the wire together.

3. The jar trimming machine comprising bending mechanism to bend the trimming part way around the neck of the jar, wipers to complete the bending, a twister to twist the ends of the wire together, and means for bringing the twister into operative relation with the ends of the wire.

4. The jar trimming machine comprising bending mechanism to bend the trimming part way around the neck of the jar, wipers to complete the bending, a twister to twist the ends of the wire together, and means for moving the twister into operative position to engage the ends of the wire.

5. The jar trimming machine comprising a conveyor for moving the jars to be trimmed in a single direction through the machine, means located on one side of the conveyor to bend the wire around the neck of the jar, and a twister located on the opposite side of the conveyor.

6. The jar trimming machine comprising a conveyor for moving the jars to be trimmed in a single direction longitudinally through the machine, stationary positioning members on opposite sides of the conveyor and adapted to hold the jar against lateral displacement, means located on one side of the conveyor to bend the wire around the neck of the jar, and a twister located on the opposite side of the conveyor from the bending means.

7. The jar trimming machine comprising bending means to bend the wire around the neck of the jar, a twister to twist the ends of the wire together and means for automatically moving the twister toward and from the neck of the jar after the operation of said bending means.

8. The jar trimming machine comprising bending means to bend the wire around the neck of the jar, a rotatable twister to twist the ends of the wire together, means to move the twister toward and from the neck of the jar, and means for automatically rotating said twister a predetermined amount when moved toward the jar.

9. A twister for a jar trimming machine which comprises a rotary head formed with relatively fixed, spaced, upper and lower lips separated by a V-shaped nose.

10. In a jar trimming machine and in combination, rotatable twister which comprises upper and lower lips separated by a V-shaped nose the point of which is substantially in the axis of rotation, and means for moving said twister toward and from the neck of a jar to cause said nose to enter between and spread the ends of a wire thereon.

11. A twister for a jar trimming machine comprising upper and lower lips separated by a V-shaped nose formed by two movable members hinged together and to the twister at the point of the nose.

12. In a jar trimming machine and in combination, a rotatable twister comprising upper and lower lips separated by a V-shaped nose formed by two movable members hinged together substantially at the point of said nose, means for rotating the twister and means for moving said movable members.

13. In a jar trimming machine and in combination, a rotatable twister comprising upper and lower lips separated by two movable members hinged together to form a nose, means for rotating the twister, means for moving said twister longitudinally of its axis of rotation and independent means for moving said movable members.

14. In a jar trimming machine and in combination, a conveyor, bending mechanism on one side of the conveyor, a rotatable twister on the opposite side of the conveyor, means for rotating said twister, means for moving the twister axially toward and from the conveyor, said twister including pivoted bending members and means for moving said bending members independently of the other movements of said twister.

15. In a jar trimming machine and in combination, a swinging bender of U-shape, the legs of which are adapted to engage the wire to be bent around the neck of the jar, wipers adapted to engage the wire at a point beyond the point at which the wire is engaged by the bender, and a twister adapted to engage the crossed ends of the wire at a point beyond the points where the wire is engaged by the wipers.

16. In a jar trimming machine and in combination, a bender for bending the trimming part way around the neck of the jar, swinging elbow-shaped wipers comprising arms pivoted on axes parallel to the main axis of the jar, the portion of the said wipers near the point of contact with the trimming being yielding, and means for causing the said wipers to move inwardly to engage the trimming at a point beyond the largest diameter of the jar.

In testimony whereof I affix my signature.

JOHN L. KIVLAN.